United States Patent [19]

Johns, Sr.

[11] Patent Number: 4,698,731

[45] Date of Patent: Oct. 6, 1987

[54] MECHANIC'S CREEPER

[76] Inventor: Frederick W. Johns, Sr., Rt. 2, Box 220, Hardy, Ark. 72542

[21] Appl. No.: 781,700

[22] Filed: Sep. 30, 1985

Related U.S. Application Data

[63] Continuation-in-part of Ser. No. 662,497, Feb. 19, 1985, abandoned.

[51] Int. Cl.[4] .................. B60Q 1/00

[52] U.S. Cl. .................. 362/61; 362/191

[58] Field of Search .................. 362/61, 217, 222, 191, 362/200

[56] References Cited

U.S. PATENT DOCUMENTS

| | | | |
|---|---|---|---|
| 1,722,773 | 7/1929 | Stewart | 362/421 |
| 4,181,928 | 1/1980 | Zelina | 362/200 |
| 4,232,357 | 11/1980 | Dietz | 362/61 |
| 4,432,043 | 2/1984 | Yuen | 362/200 |

FOREIGN PATENT DOCUMENTS

| | | | |
|---|---|---|---|
| 2091862 | 8/1982 | United Kingdom | 362/200 |

OTHER PUBLICATIONS

J. C. Whitney and Co., Parts and Accessories, Catalog No. 442D.

*Primary Examiner*—Craig R. Feinberg
*Assistant Examiner*—David A. Okonsky
*Attorney, Agent, or Firm*—Walker & McKenzie

[57] ABSTRACT

A mechanic's creeper including a body member having a forward end and a rearward end, a plurality of rollers attached to the body member for rollably supporting the mechanic with respect to a target area of an automobile or the like, a light member for selectively illuminating the target area, and an extension member fixedly secured to the forward end of the body member, the light member being secured to the extension member.

8 Claims, 8 Drawing Figures

MECHANIC'S CREEPER

CROSS-REFERENCE TO RELATED APPLICATION

This is a continuation-in-part of my pending application, Ser. No. 06/662,497, Filed Feb. 19, 1985 and now abandoned, entitled "Creeper With Light Attached"

BACKGROUND OF THE INVENTION

1. Field of the Invention:

The present invention relates in general to mechanic's creepers (i.e., small frames or platforms mounted on rollers or casters used for supporting a mechanic's body when working under or adjacent an automobile) and the like.

2. Description of the Prior Art:

A typical mechanic's creeper consists of an elongated, substantially flat body member having a forward end and a rearward end for supporting a mechanic's body in a substantially face-up, prostrate position beneath an automobile, including a cushion member attached to the body member substantially adjacent the forward end thereof for supporting the mechanic's head substantially directly beneath a target area of the underneath side of the automobile, and including a plurality of rollers attached to the body member for allowing the mechanic to easily move underneath the automobile with respect to the target area. Dietz, U.S. Pat. No. 4,232,357 discloses a collapsible mechanic's creeper which supports a mechanic in a sitting position and which includes an upstanding support column for supporting a lamp and/or various tool holding trays and the like; the lamp is energized either by way of cables extending from the lamp to an automobile storage battery or by way of cables extending to alternating current power mains. None of the above devices disclose or suggest the present invention.

SUMMARY OF THE INVENTION

The present invention is an improvement over prior mechanic's creepers and the like. The improved mechanic's creeper of the present invention includes, in general, a body member having a forward end and a rearward end, a plurality of rollers attached to the body member for rollably supporting a mechanic on the body member with respect to a target area of an automobile or the like, a light means for selectively illuminating the target area, and an extension member fixedly secured to the forward end of the body member, the light member being secured to the extension member.

DESCRIPTION OF THE PREFERRED EMBODIMENT

The improved creeper 11 of the present invention is of the basic type for movably supporting the body of a mechanic 13 or the like when working on an automobile 15 or the like.

Figure 1:
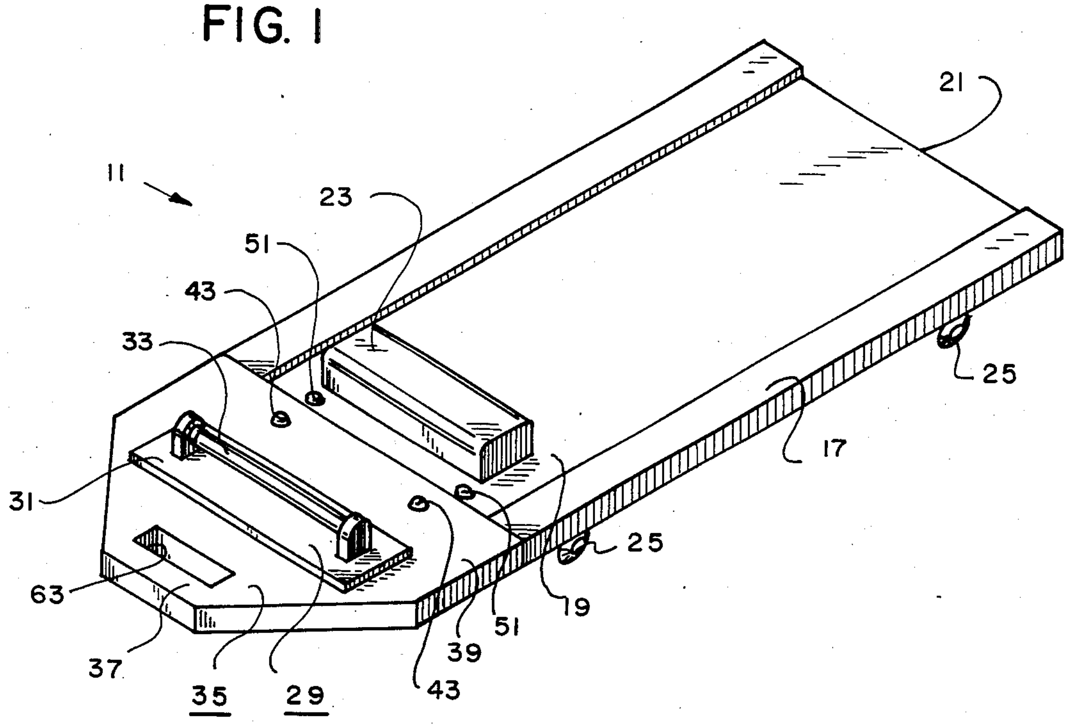
FIG. 1 is a perspective view of the improved mechanic's creeper of the present invention.
Figure 2:
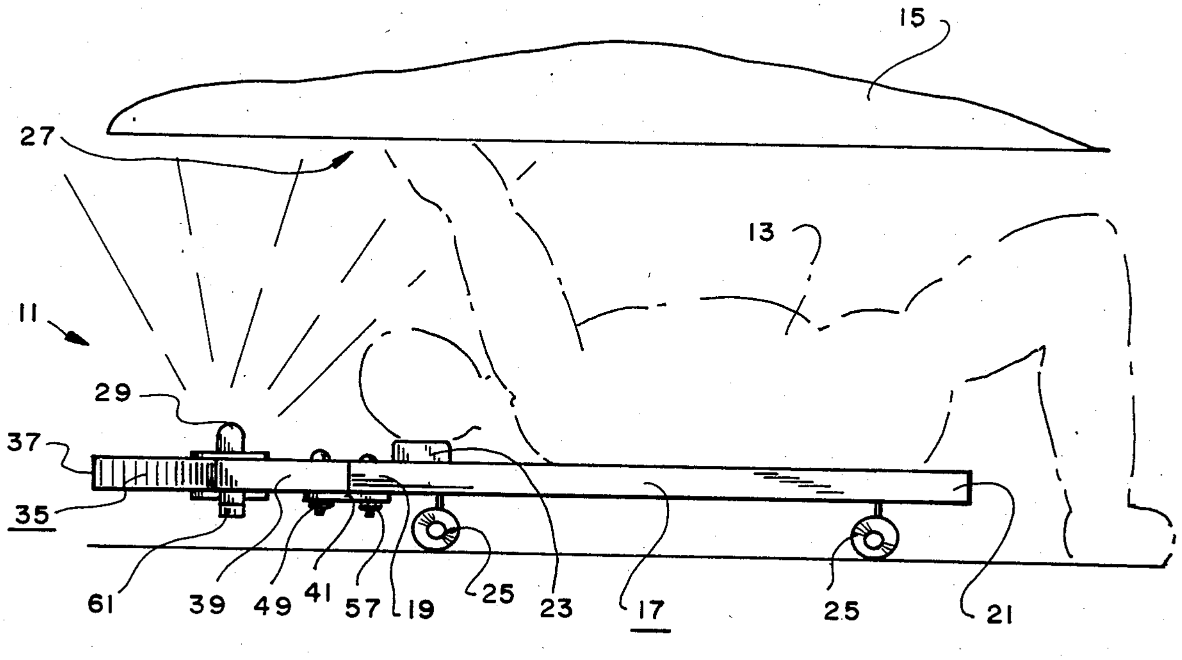
FIG. 2 is a side elevational view of the improved creeper of the present invention shown rollably supporting a mechanic beneath an automobile.
Figure 3:
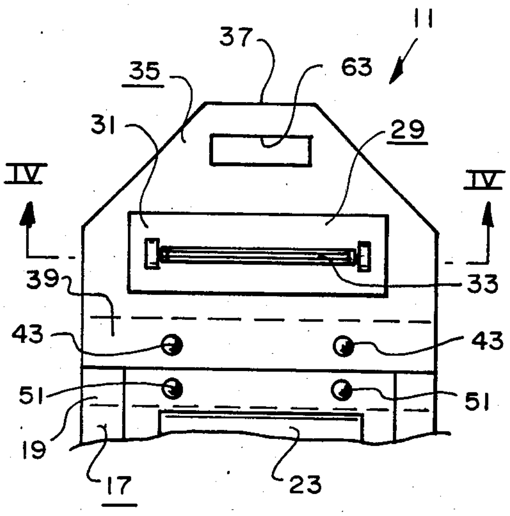
FIG. 3 is a top plan view of a portion of the improved creeper of the present invention.
Figure 4:
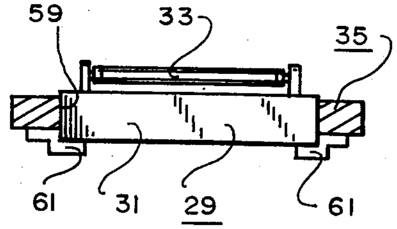
FIG. 4 is a sectional view substantially as taken on line IV—IV of FIG. 3.

The preferred embodiment of the creeper 11 includes an elongated, substantially flat body member having a forward end 19 and a rearward end 21 for supporting the body of the mechanic 13 in a substantially face-up, prostrate position beneath the automobile 15 as clearly shown in FIG. 2. The specific construction and size of the body member 17 may vary as will be apparent to those skilled in the art. Thus, for example, the body member 17 may be constructed of wood and may be roughly 4 feet (1.2 meters) long by roughly 2 feet (0.06 meters) wide. A cushion member 23 constructed of foam rubber or the like is preferably attached to the body member 17 substantially adjacent the forward end 19 thereof for supporting the head of the mechanic 13 as shown in FIG. 2. A plurality of rollers 25 are attached to the body member 17 for allowing the mechanic 13 to easily move underneath the automobile 15 so as to postion his head relative to a target area 27 of the underneath side of the automobile 15 as shown in FIG. 2.

The preferred embodiment of the creeper 11 includes a light means 29 for selectively illuminating the target area 27 and an attachment means fixedly secured to the body member 17 adjacent the forward end 19 thereof for receiving the light means 29 and for attaching the light means 29 relative to the body member 17 adjacent the forward end 19 thereof.

Figure 7:
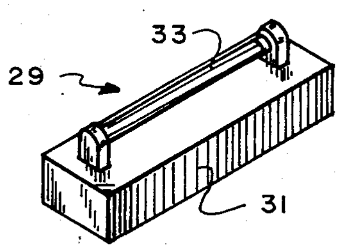
FIG. 7 is a perspective view of the light means of the improved creeper of the present invention.

The light means 29 preferably includes a base member 31 and a bulb member 33 as shown in FIG. 7. The base member 31 may include a battery and a circuit for coupling the battery to the bulb member 33 to energize the bulb member 33. A switch (not shown) is preferably provided to allow the bulb member 33 to be selectively energized. The bulb member 33 may be of any typical incandescent or fluorescent type and may include typical lens members, reflectors and the like. The light means 29 may include means for allowing the bulb member 33 to be moved relative to the base member 31 to allow the bulb member 33 to be directed toward the target area 27. Thus, for example, the light means 29 may include a flexible "goose-neck" member for joining the bulb member 33 to the base member 31, etc., as will now be apparent to those skilled in the art.

Figure 5:
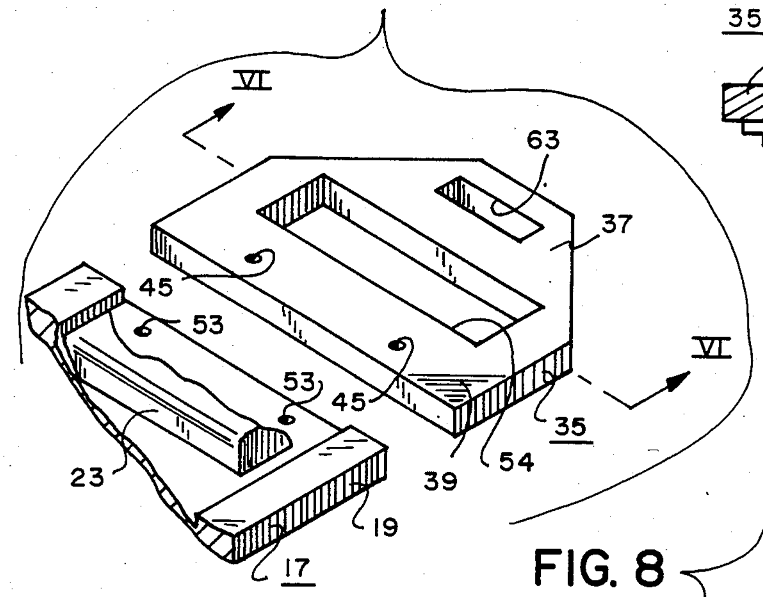
FIG. 5 is a perspective view of the extension member and associated parts of the improved creeper of the present invention.
Figure 6:
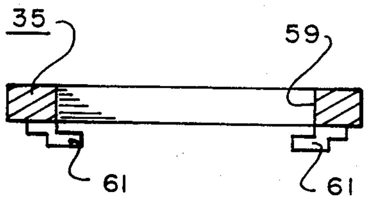
FIG. 6 is a sectional view as taken on line VI—VI of FIG. 5.
Figure 8:
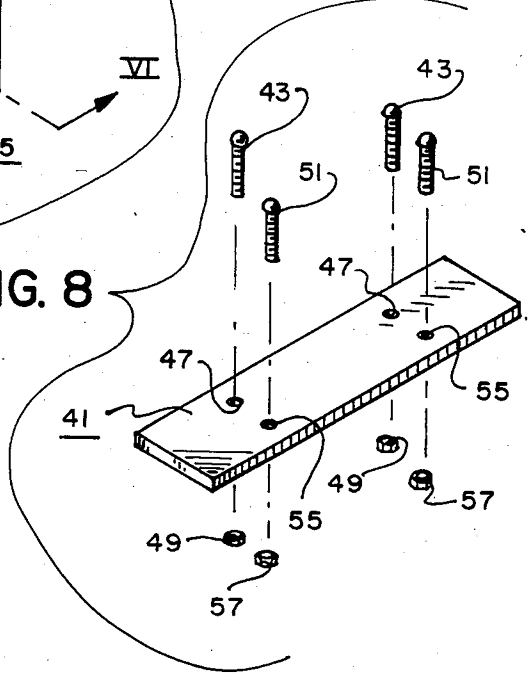
FIG. 8 is a perspective view of a reinforcing plate and associated parts of the improved creeper of the present invention.

The attachment means preferably includes a substantially flat extension member 35 having a forward end 37 and a rearward end 39 as shown in FIG. 5. The rearward end 39 of the extension member 35 is fixedly attached to the forward end 19 of the body member 17 whereby the extension member 35 defines an extension to the forward end 19 of the body member 17. It should be noted that the extension member 35 may be constructed as a separate unit from the body member 17 as shown in the drawings or may be constructed as an integral, one-piece unit with the body member 17. When constructed as a separate unit, the extension member 35 may be fixedly attached to the body member 17 by way of a reinforcing plate 41 (see FIG. 8) fixedly attached to the rearward end 39 of the extension member 35 and to the forward end 19 of the body member 17 for rigidly securing the extension member 35 to the body member 17. More specifically, bolts 43 may extend through apertures 45 through the rearward end 39 of the extension member 35 and through apertures 47 through the reinforcing plate 41 and may be secured thereto by nuts 49; and bolts 51 may extend through apertures 53 through the forward end 19 of the body member 17 and through apertures 55 through the reinforcing plate 41 and may be secured thereto by nuts 57 whereby the extension member 35 is rigidly and securely fixed to the forward end 19 of the body member 17. The reinforcing plate 41 may be constructed of substantially rigid sheet metal or the like.

The extension member 35 is provided with a cavity for receiving the base member 31 of the light means 29 to allow the light means 29 to be attached to the extension member 35 forward of the cushion member 23 for illuminating the target area 27 when the head of the mechanic 13 supported on the cushion member 23 is located substantially directly beneath the target area 27 as shown in FIG. 2. More specifically, the extension member 35 has a cavity 59 therethrough into which the base member 31 of the light means 29 is positioned. Bracket means 61 are preferably attached to the extension member 35 beneath the aperture 59 therethrough for preventing the base member 31 of the light means 29 from passing completely through the aperture 59. Each bracket means 61 may consist of a finger-like metal member fixedly attached to the underneath side of the extension member 35 in any manner now apparent to those skilled in the art such as by way of screws or the like (not shown) for engaging the bottom surface of the base member 31 to act as a stop for the base member 31. The base member 31 and the aperture 59 are preferably sized and shaped so as to provide a tight fit therebetween. The bracket means 61 merely insures that the light means 29 is held in place. The extension member 35 preferably has an elongated slot 63 therethrough adjacent the forward end 37 thereof to provide a convenient hand grip or the like for the creeper 11.

The creeper 11 is used by the mechanic 13 in the same manner as a typical creeper. However, when the mechanic 13 desires to illuminate the target area 27, he merely energized the bulb member 33 by way of the typical switch or the like (not shown).

As thus constructed and used, the present invention provides an improved mechanic's creeper which illuminate a target area of an automobile or the like without having dangerous electrical cables extending therefrom to a source of electrical energy, which illuminates the target area substantially directly over the mechanic's head when the mechanic is lying on the creeper in a substantially face-up, prostrate position, etc.

Although the present invention has been described and illustrated with respect to a preferred embodiment thereof and a preferred use therefore, it is not to be so limited since changes and modifications can be made therein which are within the full intended scope of the invention.

I claim:

1. A creeper of the type including a body member having a forward end and a rearward end and including a plurality of rollers attached to said body member for rollably supporting a person with respect to a target area, wherein the improvement comprises:

(a) light means for selectively illuminating said target area; and (b) attachment means fixedly secured to said body member adjacent said forward end thereof for receiving said light means and for attaching said light means relative to said body member adjacent said forward end thereof, said attachment means being substantially planar and having a cavity therein for holding said light means.

2. A creeper of the type including a body member having a forward end and a rearward end and including a plurality of rollers attached to said body member for rollably supporting a person with respect to a target area, said body member being elongated and substantially flat for supporting the body of the person in a substantially face-up, prostrate position, wherein the improvement comprises:

(a) light means for selectively illuminating said target area; and (b) attachment means fixedly secured to said body member adjacent said forward end thereof for receiving said light means and for attaching said light means relative to said body member adjacent said forward end thereof; said attachment means including a substantially flat extension member having a forward end and a rearward end, said rearward end of said extension member being fixedly attached to said forward end of said body member; said extension member of said attachment means having a cavity therein for holding said light means.

3. The creeper of claim 2 in which said light means includes a base member and a bulb member, and in which said base member is sized so as to securely fit within said cavity in said extension member of said attachment means.

4. The creeper of claim 3 in which said light means includes a flexible neck member joining said base member and said bulb member.

5. The creeper of claim 3 in which said base member of said light means includes battery means for energizing said bulb member.

6. The creeper of claim 5 in which said attachment means includes bracket means attached to said extension member thereof beneath said cavity therein for preventing said base member of said light means from passing through said cavity.

7. The creeper of claim 6 in which said attachment means includes a reinforcing plate fixedly attached to said rearward end of said extension member and to said forward end of said body member for rigidly securing said extension member to said body member.

8. A mechanic's creeper of the type including an elongated, substantially flat body member having a forward end and a rearward end for supporting the mechanic's body in a substantially face-up, prostrate position beneath an automobile, including a cushion member attached to said body member substantially adjacent said forward end thereof for supporting the mechanic's head relative to a target area of the underneath side of the automobile, and including a plurality of rollers attached to said body member for allowing the mechanic to easily move underneath the automobile with respect to the target area, wherein the improvement comprises:

(a) light means for selectively illuminating the target area, said light means including a base member and a bulb member;

(b) an elongated, substantially flat extension member attached to and extending forwardly of said forward end of said body member, said light means being attached to said extension member forward of such cushion member for illuminating the target area when the mechanic's head supported on said cushion member is located substantially directly beneath the target area, said extension member having an aperture therethrough into which said base member of said light means is positioned; and (c) bracket means attached to said extension member beneath said aperture therethrough for preventing said base member of said light means from passing through said aperture.

* * * * *